United States Patent
De Mey et al.

(10) Patent No.: US 6,603,820 B1
(45) Date of Patent: Aug. 5, 2003

(54) DEMODULATOR HAVING ROTATION MEANS FOR FREQUENCY OFFSET CORRECTION

(75) Inventors: Eric De Mey, Purasca (CH); Johathan L. Watson, Zürich (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/473,539

(22) Filed: Dec. 28, 1999

(30) Foreign Application Priority Data

Jan. 6, 1999 (EP) .............................. 99200026

(51) Int. Cl.$^7$ ................................. H03D 3/00
(52) U.S. Cl. ...................... 375/322; 375/371
(58) Field of Search .................. 375/261, 271, 375/272, 279, 281, 322, 326, 327, 329, 344, 371; 329/300, 302, 304, 306, 307

(56) References Cited

U.S. PATENT DOCUMENTS

| | | | | |
|---|---|---|---|---|
| 4,253,184 A | * | 2/1981 | Gitlin et al. .................. 333/18 |
| 4,317,210 A | | 2/1982 | Dekker et al. | |
| 4,599,732 A | * | 7/1986 | LeFever ....................... 375/346 |
| 5,287,067 A | | 2/1994 | Denno et al. ................ 329/304 |
| 5,386,239 A | * | 1/1995 | Wang et al. ................. 348/470 |
| 5,400,366 A | * | 3/1995 | Iwamatsu .................... 375/264 |
| 5,422,917 A | * | 6/1995 | Scott .......................... 375/371 |
| 5,550,869 A | | 8/1996 | Gurantz et al. ............. 375/340 |
| 5,574,399 A | | 11/1996 | Oura et al. .................. 329/306 |
| 5,754,591 A | * | 5/1998 | Samueli et al. ............. 329/307 |

FOREIGN PATENT DOCUMENTS

EP          0451289 A1    10/1991    ........... H04L/27/22

* cited by examiner

Primary Examiner—Don N. Vo
(74) Attorney, Agent, or Firm—Dicran Halajian

(57) ABSTRACT

A demodulator for angle modulated signals having a carrier frequency includes a demodulation channel provided with a local oscillator and with an channel output for supplying angle modulated output signals. A frequency error detector is coupled to the channel output for deriving a local oscillator frequency error signal. A frequency error corrector has two inputs and an output for providing the frequency error corrected angle modulated signals, one input whereof is coupled to the channel output, whereas its other input is coupled to the frequency error detector. The frequency error corrector is embodied as a complex plane rotator for providing complex angle modulated signals by complex plane rotation of a representation of the angle modulated signals and the local oscillator frequency error signals. Advantageously an easy implementable demodulator for Soft Decision Information demodulation schemes is provided.

14 Claims, 1 Drawing Sheet

DEMODULATOR HAVING ROTATION MEANS FOR FREQUENCY OFFSET CORRECTION

FIELD OF THE INVENTION

The present invention relates to a demodulator for angle modulated signals having a carrier frequency, the demodulator comprises:

- a demodulation channel provided with a local oscillator and with an channel output for supplying a representation of angle modulated signals;
- a frequency error detection means coupled to the channel output for deriving a local oscillator frequency error signal; and
- a frequency error correction means having two inputs and an output for providing the frequency error corrected angle modulated signals, one input whereof is coupled to the channel output, whereas its other input is coupled to the frequency error detection means The present invention also relates to a receiver, a transceiver and to a communication device each respectively provided with such a demodulator outlined in claim

BACKGROUND OF THE INVENTION

Such a receiver is known from U.S. Pat. No. 4,317,210. The known receiver comprises a demodulation channel embodied with a quadrature frequency transposition stage having a local oscillator and with an argument detector connected thereto. At a channel output of the demodulation channel there are connected a frequency error detection means and a frequency error correction means. The frequency error detection means is embodied with a series arrangement of a differentiator, a DC-shift detector and an integrator for supplying a local oscillator frequency error signal, which is representative of a possible frequency shift between the local oscillator frequency and the carrier frequency of received signals which are input to the demodulator. The frequency error correction means is embodied with a difference producer in the form of a subtracter, wherein the local oscillator frequency error signal is subtracted from a signal on the channel output, which signal represents angle modulated signals to yield an subtracter angle modulated output signal which is at least free of the aforementioned possible frequency shift.

It is a disadvantage of the known receiver that the demodulation hardware concept is not applicable to a wider range of in particular the more advanced demodulation schemes.

SUMMARY OF THE INVENTION

It is an object of the present invention to provide a receiver, transceiver or other communication device, each comprising a demodulator which is applicable in more sophisticated demodulation schemes also.

Thereto the demodulator according to the present invention is characterised in that the frequency error correction means are embodied as complex plane rotation means for providing complex angle modulated signals by complex plane rotation of a representation of said angle modulated signals and said local oscillator frequency error signals.

It is an advantage of the demodulator according to the present invention that the complex plane rotation means apart from the fact that these rotation means can itself be implemented either analog or digital, allow application in so called Soft Decision Information (SDI) demodulation methods. These are methods for extracting data symbols from in phase (I) or quadrature (Q) down-converted and demodulated angle modulated representative signals on the channel output, such as for example in Zero Intermediate Frequency (Zero-IF) or near Zero-IF demodulators, wherein use is being made of Shift Keying, such as Phase Shift Keying, Frequency Shift Keying, their multi-level variants and the like. The demodulator according to the invention is therefore particularly but not exclusively well suited for application in pagers, mobile telephones and the like communication devices.

An embodiment of the demodulator according to the invention has the characterising features that the demodulator comprises a symbol value determining circuit coupled to the complex plane rotation means. This leads to a simple embodiment of the demodulator as a whole because by simply inspecting the signs of the real and imaginary parts of the complex signal output of said rotation means a data symbol value can be determined in e.g. a slice circuit. For example in the case of a 4-level FSK scheme easy quadrant inspection may be performed to find four possible data symbols.

In a further embodiment the demodulator according to the invention is characterised in that the demodulator comprises a phase velocity estimating means coupled to the channel output of the demodulation channel. Advantageously the result provided is the phase velocity of the signal, which according to a still further embodiment of the invention after integration in an integrator coupled to the phase velocity estimating means yields as the phase of its complex integrator output a signal, which is representative for the modulation frequency $\omega$.

A still further embodiment of the demodulator according to the invention is characterised in that the frequency error detection means are coupled to the channel output through coupling to the output of the frequency error correction means, and that the frequency error detection means comprises a series arrangement of an overdeviation detector and an up/down counter having a counter output which is coupled to the other input of the frequency error correction means. This embodiment advantageously provides an alternative for the arrangement of the frequency error detection means.

At wish in alternative embodiments the complex plane rotation means are implemented either analog or digital. In case of a digital implementation the demodulator according to the invention is characterised in that the complex plane rotation means comprises a processor which is programmed to perform a rotation of input signals in the complex plane. Because of the programmability of the processor this provides additional design flexibility for the demodulator.

BRIEF DESCRIPTION OF THE DRAWINGS

At present the demodulator according to the invention will be elucidated further together with its additional advantages while reference is being made to the appended drawing, wherein similar components are being referred to by means of the same reference numerals. In the drawing.

DETAILED DESCRIPTION OF THE INVENTION

Figure 1:
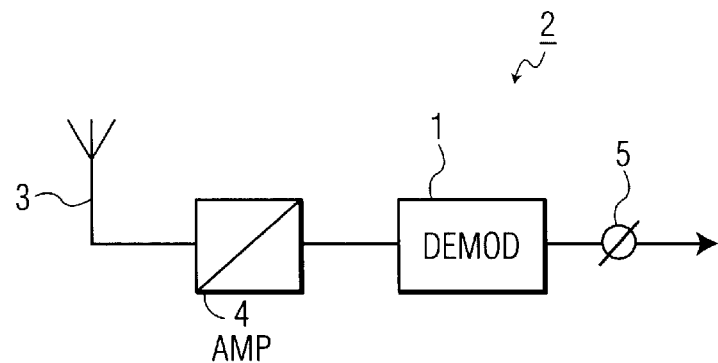
FIG. 1 schematically shows a receiving part of a communication device containing the demodulator according to the present invention.
Figure 2:
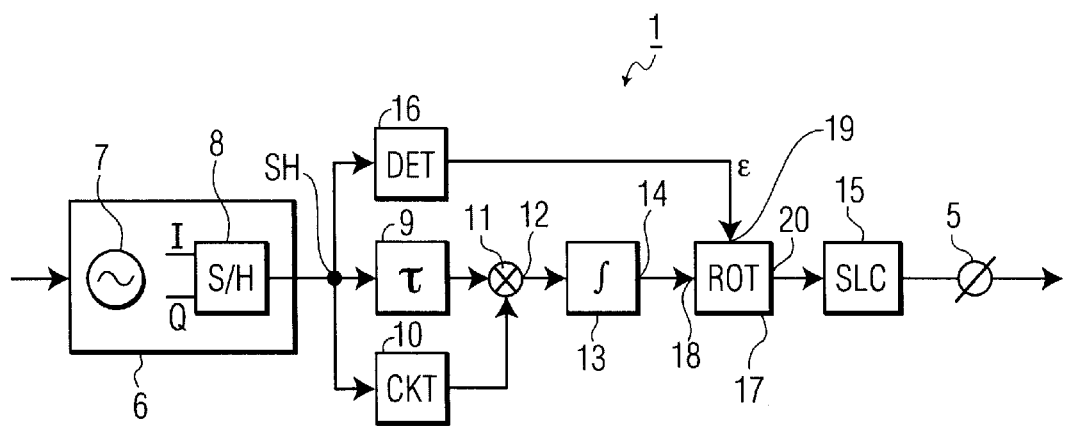
FIG. 2 shows a schematic diagram of a first embodiment of the demodulator according to the present invention.
Figure 3:
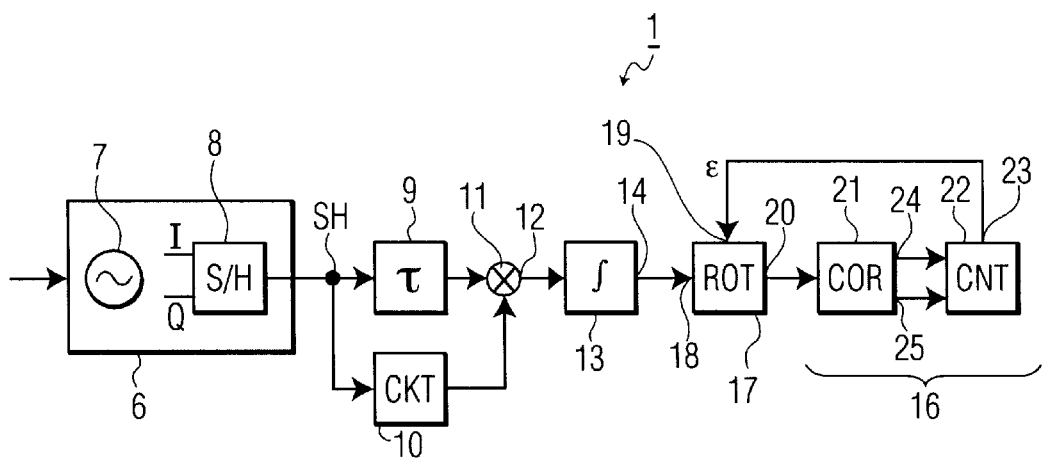
FIG. 3 shows a schematic diagram of a second embodiment of the demodulator according to the present invention.

FIGS. 2 and 3 show embodiments of a demodulator 1 for angle modulated signals. Such a demodulator 1 may be included in a receiving part of a receiver or a transmitter-receiver generally called a transceiver. Further examples of communication devices wherein the demodulator may be applied are pagers or telephone devices as for example in mobile and/or portable telephones. Schematically a communication device 2 is shown in FIG. 1, which device 2 contains a receiving part embodied as a series arrangement of an antennae 3, filter/amplifiers 4 and the demodulator 1 for providing data on data output 5 of the demodulator 1. The device 2 is e.g. capable of receiving two or more level PSK or FSK signals for example angle modulated on a carrier frequency.

FIG. 2 shows one embodiment of the demodulator 1. It is shown to contain a demodulation channel 6 connected to the filter/amplifiers 4 for frequency down conversion of signals received on the antennae 3, such as in a zero-IF receiver or near zero-IF receiver as applied in pagers or mobile telephone devices. The demodulation channel 6 as shown contains a local oscillator 7 in an arrangement as shown in FIG. 1 of U.S. Pat. No. 4,317,210, whose teachings are considered to be included herein by reference thereto. Incoming in phase and quadrature signals I and Q as also indicated in FIG. 2 are fed to a sample and hold circuit 8 having a channel output (SH). Thereafter the I and Q samples are being delayed in delay line 9 connected in series with the circuit 8. The delay time of the delay line 9 equals $\tau$. Simultaneously with the delay the I and Q complex conjugates are being taken in a parallel arranged circuit 10. Thereafter combined mixing in mixer 11 takes place yielding an signal on mixer output 12, which represents an estimate for the phase velocity of the incoming signals in the form of an angle representative complex quantity. Subsequent integration over a symbol period of the data concerned in an integrator 13 connected to mixer output 12 reveals an complex average modulation frequency of the received angle modulated signal. The phase of integrator output 14 is representative of the modulation frequency $\omega$, multiplied by the delay time $\tau$. Coupled to integrator output 14 is a slice circuit 15, which determines the data symbol value by determining the range in which the phase of the complex output 14 lies. In case of a 4-level FSK (4-FSK) the value of $\tau$ is chosen such that for the output 14, each of the four possible symbols lie in a different quadrant. In this case the slice circuit 15 determines the symbol value by inspecting the signs of the real and imaginary parts of the complex signal output 14. The demodulation scheme of this demodulator embodiment and described thus far is known as the SDI (Soft Decision Information) demodulator topology.

Since in practice the mixing down in the demodulation channel 6 to for example either Radio Frequency (RF) or (non-zero) IF takes place by the local oscillator 7, generally containing such as in pagers a crystal oscillator as a reference, there will exist a frequency error between the local oscillator frequency and the carrier frequency due to manufacturing tolerances, aging and temperature effects. This error is detected in a frequency error detection means 16 coupled to the channel output (SH) for deriving a local oscillator frequency error signal $\epsilon$. The demodulator also comprises a frequency error correction means 17 having two inputs 18 and 19 and an output 20 for providing the frequency error corrected angle modulated signals. One input 18 is coupled to the channel output SH, whereas the other input 19 is coupled to the frequency error detection means 16. The frequency error correction means 17 are embodied as complex plane rotation means for providing complex angle modulated signals by complex rotation of a representation of the angle modulated signals on output 14 and the local oscillator frequency error signal on other input 19. The rotation thus takes place over an angle which corresponds to minus the local oscillator frequency error $\epsilon$ multiplied by the delay time $\tau$. The result on output 20 is a local oscillator frequency error corrected signal, which contains angle modulated data, which is fed to the slice circuit 15 for the data symbol determination explained above. The complex plane rotation means 17 may be embodied as a multiplier or a mixer for rotation in the complex plane of signals on the respective inputs 18 and 19. This rotation is equivalent to a multiplication in the complex plane, wherein the signals on inputs 18 and 19 may be represented.

FIG. 3 shows an alternative embodiment of the demodulator 1, wherein the frequency error detection means 16 are coupled to the channel output (SH) through coupling to the output 20 of the frequency error correction means 17. In this embodiment the frequency error detection means 16 comprises a series arrangement of an overdeviation detector 21 and an up/down counter 22 having a counter output 23 which is coupled to the other input 19 of the frequency error correction means 17. The overdeviation detector 21 determines an overdeviation or an underdeviation of the angle modulated signal as follows. The value of the delay time $\tau$ is chosen such that when the local oscillator frequency error equals zero for all possible modulation values, the output 20 has a phase in the range between $-\pi/2$ and $+\pi/2$. The overdeviation detector 21 detects when a positive offset or a negative offset has occurred by detecting whether the output 20 has a phase greater than $\pi/2$ or less than $-\pi/2$ respectively. Corresponding output signals are then provide on respective positive and negative offset outputs 24 and 25 respectively. The counter 22 connected thereto counts up every time a positive offset is detected and counts down every time a negative offset is detected. This provides the local oscillator frequency error signal $\epsilon$ on the other input 19 of the complex plane rotation means 17.

An alternative to the arrangement of the rotation means 17 in case the integrator output 14 is a digital signal is formed by the following rotation algorithm. Let the signal on the integrator output 14 be a pair of integers in the range [0,N−1] representing the real and imaginary parts of the output 14 signal, and let the frequency error signal on input 19 be a signed integer S representing the frequency offset error in the range $[-\pi/\tau, \pi/\tau]$, where using 2's complement notation for the binary vector S, then:

$$S=(S_0 \cdot 2^{m-1}+S_1 \cdot 2^{m-2}+S_2 \cdot 2^{m-3} \ldots S_m \cdot 2^0) \text{ with } S_n \in \{0,1\}.$$

The rotation algorithm then works as follows:

1) Let $C_0 = x_0 + jy_0$ represent the integrator output 14 to be rotated; then
2) If $S_0=1$ rotation of $\pi$ radians is required and done by performing the iteration: $C_1 = -x_0 - jy_0$,
3) If $S_0=0$ no rotation is required and $C_1 = C_0$,
4) If $S_1=1$ rotation of $\pi/2$ radians is required and done by performing the iteration: $C_2 = -y_1 + jx_1$,
5) If $S_1=0$ no rotation is required and $C_2 = C_1$.
6) Subsequent rotations approximating $\pi \cdot 2_{-L}$ are given by:

$$C_{L+1}=(x_L - 2^{(2-L)} \cdot y_L) + j \cdot (y_L - 2^{(2-L)} \cdot x_L) \text{ when } S_L=1$$

and by:

$$C_{L+1}=C_L \text{ when } S_L=0, \text{ where } L \in \{2 \ldots m\}.$$

In practice is has appeared that the thus performed rotations have a sufficient accuracy, whereas effects of the rotations on the magnitudes on the vectors are of no concern with angle modulation,

What is claimed is:

1. A demodulator for angle modulated signals having a carrier frequency, the demodulator comprises:

a demodulation channel provided with a local oscillator and with a channel output for supplying a representation of angle modulated signals;

a frequency error detection means coupled to the channel output for deriving a local oscillator frequency error signal; and a frequency error correction means having two inputs and an output for providing the frequency error corrected angle modulated signals, one input whereof is coupled to the channel output, whereas its other input is coupled to the frequency error detection means;

wherein the frequency error correction means are embodied as complex plane rotation means for providing complex angle modulated signals by complex plane rotation of a representation of said angle modulated signals in response to said local oscillator frequency error signals; and wherein the frequency error detection means are coupled to the channel output through coupling to the output of the frequency error correction means, and wherein the frequency error detection means comprises a series arrangement of an overdeviation detector and an up/down counter having a counter output which is coupled to the other input of the frequency error correction means.

2. The demodulator according to claim 1, further comprising a symbol value determining circuit coupled to the complex plane rotation means.

3. The demodulator according to claim 1, further comprising a phase velocity estimating means coupled to the channel output of the demodulation channel.

4. The demodulator according to claim 3, further comprising an integrator coupled to the phase velocity estimating means.

5. The demodulator according to claim 1, wherein the complex plane rotation means are implemented either analog or digital.

6. The demodulator according to claim 1, wherein in case the complex plane rotation means is digitally implemented it comprises a processor which is programmed to perform a rotation of input signals in the complex plane.

7. Receiver, transceiver or communication device, such as a pager, telephone device, each respectively provided with a demodulator according to claim 1.

8. A demodulator for angle modulated signals having a carrier frequency, the demodulator comprises:

a demodulation channel provided with a local oscillator and with a channel output for supplying a representation of angle modulated signals;

a frequency error detection means coupled to the channel output for deriving a local oscillator frequency error signal;

a frequency error correction means having two inputs and an output for providing the frequency error corrected angle modulated signals, one input whereof is coupled to the channel output, whereas its other input is coupled to the frequency error detection means; and a phase velocity estimating means coupled to the channel output of the demodulation channel;

wherein the frequency error correction means are embodied as complex plane rotation means for providing complex angle modulated signals by complex plane rotation of a representation of said angle modulated signals in response to said local oscillator frequency error signals.

9. The demodulator according to claim 8, further comprising a symbol value determining circuit coupled to the complex plane rotation means.

10. The demodulator according to claim 8, further comprising an integrator coupled to the phase velocity estimating means.

11. The demodulator according to claim 8, wherein the frequency error detection means are coupled to the channel output through coupling to the output of the frequency error correction means, and wherein the frequency error detection means comprises a series arrangement of an overdeviation detector and an up/down counter having a counter output which is coupled to the other input of the frequency error correction means.

12. The demodulator according to claim 8, wherein the complex plane rotation means are implemented either analog or digital.

13. The demodulator according to claim 8, wherein in case the complex plane rotation means is digitally implemented it comprises a processor which is programmed to perform a rotation of input signals in the complex plane.

14. Receiver, transceiver or communication device, such as a pager, telephone device, each respectively provided with a demodulator according to claim 8.

* * * * *